UNITED STATES PATENT OFFICE.

EMILE THEODORE BUNDSMAN, OF POINT LOMA, CALIFORNIA, ASSIGNOR TO POINT LOMA CHEMICAL COMPANY, OF POINT LOMA, CALIFORNIA, A CORPORATION OF SOUTH DAKOTA.

SULFUR DYE AND PROCESS OF MAKING SAME.

No. 897,873.        Specification of Letters Patent.        Patented Sept. 8, 1908.

Application filed October 7, 1905. Serial No. 281,761.

*To all whom it may concern:*

Be it known that I, EMILE THEODORE BUNDSMAN, a citizen of the United States, and residing at Point Loma, San Diego county, in the State of California, have invented certain new and useful Improvements in Coloring-Matters and Processes of Making the Same, of which the following is a specification.

I have discovered that the members of the group of chemicals known as the sugars may be used as "color formers" or "color bases" in the manufacture of coloring matters, either alone or in combination with other chemicals.

The sugars may be used in a great many combinations, to produce coloring matters. For instance, they will, when treated alone with the ordinary sulfuring agents of the arts, at the proper temperatures, produce new and valuable coloring matters similar in properties to the so-called sulfur-colors of the trade. They act, therefore, as individual color bases or color formers. Again, they may be sulfured in connection with such other chemicals as are in themselves color formers when sulfured, and produce coloring matters distinctly different from those produced by sulfuring the sugars or such other chemicals alone, or by a mechanical mixture of the products of the separate sulfurizations. It is evident, therefore, that by the sulfuring of a mixture of a sugar with another color forming chemical new sulfur coloring matters are produced. The sugars may therefore be said to play the part of "co-bases." These new co-bases may be sulfured in connection with an unlimited number of such other color forming chemicals, and in each instance a new coloring matter obtained; they seem, therefore, to be universal in their application, and to be properly designated as "universal co-bases." They seem to occupy a unique position in the manufacture of coloring matters, no other color base having as yet been found to have similar universal applicability. New and valuable coloring matters may furthermore be produced by sulfuring the sugars in connection with other chemicals which, while belonging to the same groups as those already described and having many analogies to such chemicals, do not in themselves possess similar color forming properties: for example, by sulfuring the sugars in combination with aromatic chemicals which will not, with sulfuring agents alone, produce coloring matters. These coloring matters are different from those produced by sulfuring of the sugars alone. The sugars, therefore, seem to give color forming properties to such non-color forming chemicals. I have caused experiments to be made with a number of non-color forming aromatic chemicals, and, in each instance, a new coloring matter has been produced. The sugars occupy a unique position in the art in this respect. I find that the best results, commercially and technically, are given by the use of grape sugar, although the other sugars, as glucose or cane sugar, give excellent results.

To sum up: I have discovered that the sugars may be used as individual color bases, and, in connection with other color forming chemicals, as co-bases, and that they impart color forming properties to still other chemicals.

The following examples will serve to illustrate the manner in which coloring matters may be produced from the sugars:

*Example I. A sugar used as a basis with sulfuring agents alone.*—Weigh out into a suitable iron crucible: 21 parts grape sugar, 15 parts sulfur, 60 parts sodium sulfid. Apply heat and raise the temperature gradually to 100° C. The sulfid will dissolve in its own water of crystallization and then dissolve the sulfur and the grape sugar. Continue raising the heat gradually until about 150° C. is reached. Heat at 140°–160° C. until the ingredients have formed a dry mass, which can be readily pulverized, and until a dyeing test shows that the full tinctorial power has been developed, when the color will be formed. The substance obtained by this process is dark brown in color, and is soluble in cold water, cold sodium carbonate solution, alcohol and caustic soda solution. It will dye unmordanted cotton a fast dark brown in the usual salt bath made alkaline with soda, with or without the assistance of sodium sulfid. The substance may also be concentrated in the usual manner by precipitation with hydrochloric acid, the substance obtained by such concentration being dark brown in color, but insoluble in cold water, cold sodium carbonate solution, alcohol and concentrated sulfuric acid, slowly soluble in caustic alkaline solution, readily soluble in cold sodium sulfid solution and dyeing unmordanted cotton a fast dark brown, in the usual salt bath made alkaline with soda, the assistance of sodium sulfid, however, being necessary in the dyeing. Variations of color ranging from a dark brown to a brown black may be obtained by changing the details of the process. For instance, by raising the temperature I obtain a color which is nearer a black.

*Example II. A sugar used as a co-basis, in connection with a color-forming chemical.*—Weigh out into a suitable crucible: 8 parts grape sugar, 12 parts sulfur, 60 parts sodium sulfid crystals. Apply heat and raise the temperature to 120° C. After one hour at this temperature dissolve in water, cool, and add 6 parts of meta-nitranilin. Raise the heat to drive off the water. Then raise the temperature gradually but steadily to 250°–300° C. and heat until a dry mass is formed, which can be readily pulverized, and until a dyeing test shows that the full tinctorial power has been developed. The process takes from seven to eight hours in all. The full tinctorial power of the color is best developed by this process, although a similar color will be produced when the meta-nitranilin is added in the beginning. The substance obtained by this process is soluble in cold water, cold sodium carbonate solution, alcohol and caustic alkaline solution, and dyes unmordanted cotton a fast bright yellowish brown shade in the usual alkaline salt bath, with or without the addition of sodium sulfid. The color may also be concentrated in the usual manner by precipitation with hydrochloric acid, the resulting substance being insoluble in cold water, cold sodium carbonate solution, alcohol, and concentrated sulfuric acid, slowly soluble in caustic alkaline solution, and readily soluble in cold sodium sulfid solution. It dyes unmordanted cotton a fast, bright yellowish brown shade, in an alkaline salt bath with the assistance of sodium sulfid. When identically the same operation is performed without the grape sugar, a dull greenish black alone is formed. This example illustrates a great number of syntheses of coloring matters that can be performed by the use of these universal co-bases in combination with other chemicals which are themselves color bases. Thus, by substituting for meta-nitranilin either meta-phenylene diamin base or meta-dinitrobenzene, in the above formula, browns will be formed somewhat similar to the brown obtained from meta-nitranilin. By using paranitrophenol a darker yellow brown is obtained. Bi-nitrochlorbenzol yields a valuable medium brown. 1.8 dinitro-naphthalene yields a valuable black. Variations of temperature will produce a variation in the shade of the product. By varying the proportions of the ingredients other variations in color can be produced.

*Example III. A sugar used to impart color-forming properties to a chemical which, under similar circumstances and conditions, is not a color-former.*—Weigh out into a suitable crucible: 8 parts grape sugar, 12 parts sulfur, 60 parts sodium sulfid crystals. Apply heat and raise the temperature to 120° C. After one hour at this temperature dissolve in water, cool, and add 6 parts of sodium salt of sulfanilic acid. Raise the heat to drive off the water, then raise the heat gradually but steadily to 150°–180° C., and heat until a dry powder is formed, or a dyeing test of the fusion shows that the color has been fully formed. The above process gives the best result, although a similar result is obtained by adding the sodium salt of sulfanilic acid in the beginning. The resulting substance is soluble in cold water, cold sodium carbonate solution, alcohol, and caustic alkaline solution, and dyes unmordanted cotton a fast medium brown in a salt bath made alkaline with soda, with or without the addition of sodium sulfid. It may also be concentrated in the usual manner by precipitation with hydrochloric acid, in which case the resulting substance will be insoluble in cold water, cold sodium carbonate solution, alcohol, and concentrated sulfuric acid, slowly soluble in caustic alkaline solution and readily soluble in cold sodium sulfid solution. It will dye unmordanted cotton a fast medium brown in the usual alkaline salt bath, with the assistance of sodium sulfid. Variations of temperature will produce a variation in the shade of the product. By varying the proportion of the ingredient other variations in color can be produced. When the same operation is performed without the grape sugar, no color is formed. This example illustrates a great number of syntheses of coloring matters that can be performed by the use of these universal color formers. Thus by substituting for the sodium salt of sulfanilic acid in the above formula, either anilin salts, benzidin, or diphenylamin, chemicals which are not color formers, when sulfured other and new colors will be produced, such as dark red with anilin salts, olive green with benzidin, and dark green with diphenylamin. These colors I have yet to perfect. The primal simplicity of constitution of these non-color forming chemicals to which my color formers impart color forming properties serves to illustrate and emphasize the unique and important position of the sugars in the manufacture of coloring matters.

I claim as my invention:

1. The process of making coloring matters consisting in heating a sugar with sulfuring substances until a non-hygroscopic, readily pulverizable dyestuff is formed, substantially as described.

2. The process of making coloring matters consisting in heating grape sugar with sulfuring substances, until a non - hygroscopic, readily pulverizable dyestuff is formed, substantially as described.

3. As a new article of manufacture, the dark brown coloring matter which can be obtained from grape sugar by heating the same with sulfur and sodium sulfid, which is non-hygroscopic, readily pulverizable, soluble in cold water, cold sodium carbonate solution, alcohol, and caustic soda solution, and which dyes cotton in an alkaline salt bath with or without the addition of sodium sulfid fast dark brown shades, and which, when heated with hydrochloric acid forms a dark brown coloring matter which is insoluble in cold water, and sodium carbonate solution, alcohol, and concentrated sulfuric acid, is easily soluble in caustic alkaline solution, and readily soluble in cold sodium sulfid solution, and dyes cotton from an alkaline salt bath with the assistance of sodium sulfid fast dark brown shades.

In testimony whereof I have hereunto signed my name in the presence of two subscribing witnesses.

EMILE THEODORE BUNDSMAN.

Witnesses:
C. THURSTON,
G. DE PURUCKER.